Patented Aug. 21, 1951

2,565,147

UNITED STATES PATENT OFFICE 2,565,147

PROCESS FOR HYDROLYZING COPOLYMERS OF MALEIC ACID DERIVATIVES

Helmuth L. Pfluger, Spring Mill, Pa., assignor to Quaker Chemical Products Corporation, Conshohocken, Pa., a corporation of Pennsylvania No Drawing. Application December 22, 1948, Serial No. 66,840

11 Claims. (Cl. 260—78.5)

This invention relates to a process for obtaining a copolymer of maleic acid or a derivative thereof with polymerizable vinyl compounds in a form substantially free of inorganic matter.

In general, any vinyl compound containing the $>C=CH_2$ group can be co-polymerized with any compound of the formula:

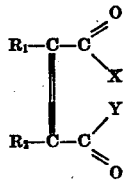

where X and Y may stand for OH, O alkyl, O aryl, or halogen; or X and Y may together stand for oxygen as disclosed by Voss and Dickhäuser in U. S. Patent 2,047,398. The present invention relates to co-polymers of vinyl compounds, for example styrene with maleic anhydride and/or maleic acid and/or sodium maleate, designated hereinafter as forms (a), (b) and (c) respectively of the maleic monomer. The specific substituents in the above structural formula corresponding to these three forms are given in the table.

Table

| Designation | Monomer | $R_1$ | $R_2$ | X | Y |
|---|---|---|---|---|---|
| (a) | maleic anhydride | H | H | ½O | ½O |
| (b) | maleic acid | H | H | OH | OH |
| (c) | sodium maleate | H | H | ONa | ONa |

For the sake of brevity in the present specification, maleic acid shall be understood to include derivatives of maleic acid in which $R_1$ and $R_2$ are other than hydrogen, such as halogen, the sulfonic acid radical or an alkyl, aryl or aralkyl radical, and styrene shall be understood to represent polymerizable compounds containing a single $>C=CH_2$ group, such as vinyl esters, vinyl ethers, vinyl halides, acrylic acid and its amide and esters, acrylo- and methacrylo-nitrile, cinnamic acid esters, etc.

When the co-polymerization is carried out in the absence of unreactive diluent, it is very difficult to control the reaction which is rapid and may become violent. The molecular weight of the product is not controllable and may be so large that it is not appreciably soluble in aqueous alkali even after long steeping. Even when a relatively pure sample is obtained, the higher molecular weight fractions must be separated by expensive and time-consuming methods of repeated precipitation with acid from an alkaline solution. With the use of a diluent such as xylene, the polymerization, may be controlled as disclosed in the Condo and Krister U. S. Patent 2,286,062. It is preferable to use a high-boiling diluent like xylene rather than the more hazardous acetone.

It is desirable to carry out the polymerization step with the maleic monomer in the form of maleic anhydride designated as form (a) in the above table because this is soluble in both styrene and the diluent xylene. The anhydride copolymer form (a) obtained is a flaky precipitate insoluble in xylene but tightly solvated by so much xylene that the complete separation of xylene by filtration is impossible. Prolonged drying does remove the xylene to yield an anhydride co-polymer, which is not the desired end-product of the present invention. The anhydride polymer is a light, fluffy powder which is extremely sensitive to static electricity and not easily wettable by water.

The object of this invention is to obtain the co-polymer of the pure maleic acid, designated as form (b) in the above table, in aqueous suspension directly from the xylene solvated co-polymer of the anhydride form (a), without passing through the dry-powder stage. This cannot be achieved practically by direct unmodified steam distillation because the partially hydrolyzed, partially desolvated co-polymer melts and coagulates into large and unmanageable masses at the temperature of steam distillation. I have found that this undesirable coagulation into a complex mixture of phases can be eliminated by the unexpectedly simple procedure of first digesting the xylene-dispersed co-polymer slurry with water under slow agitation at a temperature not substantially above 190° F. During this digestion, there takes place the gradual hydrolysis of the anhydride groups (a) essentially completely to the acid form (b).

Without this digestion, it is impossible to carry out a smooth steam distillation, unencumbered by coagulation of the co-polymer with xylene and water. However, once this simple digestion step has taken place, it is actually not necessary to carry out a steam distillation for removal of the xylene. The hydrolyzed acid form (b) of the co-polymer no longer has an affinity for the solvating xylene. It prefers instead to be solvated by water. The xylene-dispersed slurry of anhydride co-polymer is therefore converted into a water-dispersed slurry of acid polymer, with simultaneous splitting out of the xylene as a separate phase floating on top of the water-dispersed slurry. This xylene can therefore be separated either by pumping it off the top or by drawing off the lower aqueous layer.

Condo and Krister (U. S. Patent 2,286,062) effect a splitting-out of xylene by using sodium hydroxide sufficient to convert the co-polymer partially to the salt form (c). In contrast, I eliminate the addition of an alkali because I have found that it is not necessary to form a salt of the co-polymer in order to effect xylene-separation. As a matter of fact, I have found that the hydrolysis can be effected in the presence of acid (see Example 2 below). All that is required is the simple hydrolysis of the form (a) to the form (b) without passing over to the form (c). There are at least two decided advantages to carrying out my process in this way.

In the first place, the hydrolysis with plain water avoids emulsification of xylene without special precautions. When alkali is used, the hydrolysis must be very carefully controlled in order to avoid emulsification of xylene. This is inherent in the fact that the more nearly complete the conversion of the co-polymer to the salt form (c), the more effective does the co-polymer become as an emulsifying agent for xylene in water. There is a potential danger of emulsification trouble even when the over-all concentration of alkali is adjusted to be less than that required for emulsification at equilibrium conditions. This is due to the possibility of local excesses of alkali, during its addition, leading to local emulsification of xylene, followed by a slow rate of de-emulsification. This complication is entirely eliminated by the use of plain water, as in my invention.

Secondly, when alkali is added during the hydrolysis, the end-product is of necessity at least partially in the salt form (c). In order to obtain from this the essentially pure acid form (b), substantially free of salt, it is necessary to reprecipitate the acid form by addition of acid, followed by washing and finally drying if desired. This procedure thus involves additional expense for chemicals and additional processing steps. In contrast to this, by the use of my invention the original dexylenated aqueous slurry is itself a suspension of the completely organic product, the maleic acid co-polymer (b), and this may be dried directly to yield a completely organic product, free of salt, without the aforementioned expense for materials and further processing.

Once the non-alkaline digestion has been carried out, it is possible, if so desired, to steam distil the xylene, without the formation of the previously mentioned coagulation. If the digestion were carried out in alkaline medium as by Condo and Krister, steam distillation would be complicated and made impossible by violent foaming.

The dried maleic acid co-polymer (b) obtained by my process is a semi-crystalline sand-like powder, quite different from the maleic anhydride co-polymer (a) which is a fluffy and static-electricity-sensitive dust. If desired, the slurry of maleic acid co-polymer (b) can be converted to any stage between that of (b) and (c) by this simple addition of the appropriate ratio of alkali. This can be effected without the danger of xylene emulsification since xylene has been removed before the addition of alkali.

*Example I*

11.3 parts by weight of styrene and 10.7 parts maleic anhydride are dissolved in 128 parts of xylene in a stainless steel or glass-lined kettle equipped with oil heat. The solution is heated with stirring until the temperature reaches 140° F. Then 0.055 part of benzoyl peroxide is added and the heating is continued until the temperature reaches 185° F. The heat of reaction raises the temperature to 250° F. or higher. The polymer separates out of solution and is present in suspended condition as a white slurry in the xylene. Polymerization is considered complete when the temperature has started to drop.

The xylene-dispersed slurry at 250° F. is added to 111 parts of water at 150–160° F. in another vessel, also preferably stainless steel or glass-lined. No sodium hydroxide or other alkali is added. The plain water phase and the xylene-dispersed slurry are agitated together for 1½ hours. During this digestion period, the temperature is maintained at 175–180° F. The temperature is not allowed to exceed 190° F. in order to prevent gummy aggregation. Finally, the agitation is stopped and the material is allowed to stand until there is a clean split between a lower layer of aqueous co-polymer slurry and an upper layer of clear xylol. This top layer of xylol is pumped off.

The lower layer of aqueous slurry is either evaporated to yield the dry acid form of the co-polymer, or it is treated with 10.0 to 10.8 parts of 50° Bé. sodium hydroxide and cooked until a desired concentration of solids is attained, the product in this case being a solution of a partially "saponified" co-polymer acid. This product is a viscous, off-white liquid, readily dispersible in water. Instead of caustic soda, an equivalent amount of any other base may be used, such as sodium carbonate, potassium hydroxide, ammonia, methylamine or triethanolamine.

*Example II*

The polymerization in xylene is carried out in a manner similar to that described in the first paragraph of Example I.

The xylene-dispersed slurry at 250° F. is then added to 110 parts of water to which has been added 1 part of concentrated hydrochloric acid, the aqueous acid solution being at 150–160° F. The acid solution and the xylene-dispersed slurry are agitated together at 175–180° F. The agitator is then stopped and the material allowed to stand until there is a clean split between the lower aqueous acid layer and an upper layer of clear xylene. The top layer of xylene is pumped off and the lower layer is treated by either evaporating same to dryness, thereby yielding a co-polymer substantially free of inorganic matter, or by adding thereto a desired amount of alkaline agent to make a water-soluble product similar in appearance to that formed by alkali addition in Example II, but containing a small portion of inorganic salt (chlorides).

When the polymerizable compound containing a $>C=CH_2$ group is styrene, the styrene and maleic anhydride are preferably used in approximately stoichiometric proportion, that is one mol of styrene per mol of maleic anhydride. The styrene used should preferably be completely in the monomeric form since the presence of any polystyrene prevents or retards the separation of the solvent from the aqueous layer in the subsequent digestion step. In order to retard the formation of polystyrene, I may prefer to add to the monomeric styrene a small amount of a peroxidation inhibitor and to carry out the co-polymerization in the presence of such inhibitor. Peroxidation inhibitors are well known, the art being familiar with them on account of their use in such products as rubber and gasoline. More specifically, I prefer to use small amounts, say up to about 5 per cent on the weight of the styrene, of a peroxidation inhibitor, such as, for example, tertiary butyl catechol, hydroquinone, or elemental sulfur, to prevent the formation of polystyrene.

The co-polymerization of a polymerizable compound containing a $>C=CH_2$ group and maleic anhydride in a suitable solvent may be initiated by heating in the presence of a peroxide. Instead of the benzoyl peroxide shown in the example, other organic peroxides such as acetyl peroxide, ascaridole, dibutyryl peroxide, lauroyl peroxide, or succinyl peroxide may suitably be employed.

The temperature at which the polymerization is carried out may be considerably varied, and in fact the rate of the polymerization may be controlled by properly controlling the temperature, higher temperatures causing higher polymerization rates and forming lower molecular weight polymers.

While I have shown certain specific processes in the foregoing disclosure, it will be understood that one skilled in the art may readily employ numerous processes without departing from the spirit of this invention.

I claim:

1. In a process for producing co-polymers of maleic anhydride and polymerizable compounds containing a single $>C=CH_2$ group comprising co-polymerizing maleic anhydride in a non-reactive, water-immiscible solvent with a compound which contains a $>C=CH_2$ group to form a slurry of the co-polymer in said solvent, the steps consisting of adding water to said slurry and heating under agitation to a temperature not less than 150° F. and not exceeding 190° F. for a sufficient time to effect hydrolysis, then stopping the agitation and allowing the slurry to stand until a lower layer is formed containing an aqueous slurry of the co-polymer and an upper layer of clear solvent and separating the upper solvent layer.

2. In a process for producing co-polymers of maleic anhydride and polymerizable compounds containing a single $>C=CH_2$ group comprising co-polymerizing maleic anhydride in a non-reactive, water-immiscible solvent with a compound which contains a $>C=CH_2$ group to form a slurry of the co-polymer in said solvent, the steps consisting of adding water to said slurry and heating under agitation to a temperature not less than 150° F. and not exceeding 190° F. for a sufficient time to effect hydrolysis, then stopping the agitation and allowing the slurry to stand until a lower layer is formed containing an aqueous slurry of the co-polymer and an upper layer of clear solvent, separating the upper solvent layer and evaporating the aqueous slurry to yield a dry acid form of the co-polymer.

3. In a process for producing co-polymers of maleic anhydride and polymerizable compounds containing a single $>C=CH_2$ group comprising co-polymerizing maleic anhydride in a non-reactive, water-immiscible solvent with a compound which contains a $>C=CH_2$ group to form a slurry of the co-polymer in said solvent, the steps consisting of adding water to said slurry and heating under agitation at a temperature from about 175° to about 180° F. for a sufficient time to effect hydrolysis, then stopping the agitation and allowing the slurry to stand until a lower layer is formed containing an aqueous slurry of the co-polymer and an upper layer of clear solvent and separating the upper solvent layer.

4. In a process for producing co-polymers of maleic anhydride and polymerizable compounds containing a single $>C=CH_2$ group comprising co-polymerizing maleic anhydride in a non-reactive, water-immiscible solvent with a compound which contains a $>C=CH_2$ group to form a slurry of the co-polymer formed in said solvent, the steps consisting of adding water to said slurry and heating under agitation at a temperature from about 175°–180° F. for a sufficient time to effect hydrolysis, then stopping the agitation and allowing the slurry to stand until a lower layer is formed containing an aqueous slurry of the co-polymer and an upper layer of clear solvent, separating the upper solvent layer and evaporating the aqueous slurry to yield a dry acid form of the co-polymer.

5. In a process for producing co-polymers of maleic anhydride and polymerizable compounds containing a single $>C=CH_2$ group comprising co-polymerizing maleic anhydride in a non-reactive, water-immiscible solvent with a compound which contains a $>C=CH_2$ group to form a slurry of the co-polymer formed in said solvent, the steps consisting of adding water to said slurry and heating under agitation at a temperature from about 175°–180° F. for about 1½ hours, then stopping the agitation and allowing the slurry to stand until a lower layer is formed containing an aqueous slurry of the co-polymer and an upper layer of clear solvent and separating the upper solvent layer.

6. In a process for producing co-polymers of maleic anhydride and styrene comprising co-polymerizing maleic anhydride in xylene as a solvent with styrene containing no substantial amount of its polymer in the presence of an organic peroxidation inhibitor and an organic peroxide catalyst to form a slurry of the co-polymer formed in said solvent, the steps consisting of adding water to said slurry and heating under agitation to a temperature between 175°–180° F. for a sufficient time to effect hydrolysis, then stopping the agitation and allowing the slurry to stand until a lower layer is formed containing an aqueous slurry of the co-polymer and an upper layer of clear solvent, separating the upper xylene layer and evaporating the aqueous slurry to yield the dry acid co-polymer.

7. In a process for producing co-polymers of maleic anhydride and styrene comprising co-polymerizing maleic anhydride in xylene as a solvent with styrene containing no substantial amount of its polymer in the presence of an organic peroxidation inhibitor and an organic peroxide catalyst to form a slurry of the co-polymer in said solvent, the steps consisting of adding water to said slurry and heating under agitation to a temperature from about 175° to about 190° F. for a sufficient time to effect hydrolysis, then stopping the agitation and allowing the slurry to stand until a lower layer is formed containing an aqueous slurry of the co-polymer and an upper layer of clear solvent, separating the upper xylene layer and evaporating the aqueous slurry to yield the dry acid co-polymer.

8. In a process for producing co-polymers of maleic anhydride and polymerizable compounds containing a single $>C=CH_2$ group comprising co-polymerizing maleic anhydride in a non-reactive, water-immiscible solvent with a compound which contains a >C=CH₂ group to form a slurry of the co-polymer formed in said solvent, the steps consisting of adding water to said slurry and heating under agitation to a temperature from about 175° to about 190° F. for a sufficient time to effect hydrolysis, then stopping the agitation and allowing the slurry to stand until a lower layer is formed containing an aqueous slurry of the co-polymer and an upper layer of clear solvent, separating the upper solvent layer and adding to said aqueous slurry an alkaline solution to neutralize same and heating to produce a partially saponified co-polymer.

9. In a process for producing co-polymers of maleic anhydride and styrene comprising co-polymerizing maleic anhydride in xylene as a solvent with styrene containing no substantial amount of its polymer in the presence of an organic peroxidation inhibitor and an organic peroxide catalyst to form a slurry of the co-polymer formed in said solvent, adding an aqueous acid solution to said slurry and heating under agitation to a temperature between 175°–180° F. for a sufficient time to effect hydrolysis, then stopping the agitation and allowing the slurry to stand until a lower layer is formed containing an aqueous slurry of the co-polymer and an upper layer of clear solvent, separating the upper xylene layer and evaporating the aqueous slurry to yield the dry acid co-polymer.

10. In a process for producing co-polymers of maleic anhydride and polymerizable compounds containing a single >C=CH₂ group comprising co-polymerizing maleic anhydride in a non-reactive, water-immiscible solvent with a compound which contains a >C=CH₂ group to form a slurry of the co-polymer in said solvent, adding only water to said slurry and heating under agitation to a temperature from about 175° to about 190° F. for a sufficient time to effect hydrolysis, then stopping the agitation and allowing the slurry to stand until a lower layer is formed containing an aqueous slurry of the co-polymer and an upper layer of clear solvent, separating the upper solvent layer and adding caustic soda to said aqueous slurry and heating to produce a partially saponified co-polymer.

11. The process which comprises polymerizing (1) a compound selected from the group consisting of maleic anhydride and a maleic acid derivative of the formula

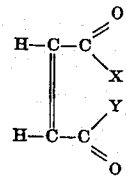

wherein X and Y are selected from the group consisting of OH, O-alkyl, O-aryl and halogen, no more than one of X and Y being OH, together with (2) an organic compound capable of being polymerized and containing a single >C=CH₂ group in a non-reactive, water-immiscible solvent to form a slurry of the co-polymer in said solvent, adding only water to said slurry and heating under agitation to a temperature from about 175° to about 190° F. for a sufficient time to effect hydrolysis, then stopping the agitation and allowing the slurry to stand until a lower layer is formed containing an aqueous slurry of the co-polymer and an upper layer of clear solvent, separating the upper solvent layer and evaporating the aqueous slurry to yield a dry acid form of the co-polymer.

HELMUTH L. PFLUGER.

REFERENCES CITED

The following references are of record in the file of this patent:

UNITED STATES PATENTS

| Number | Name | Date |
|---|---|---|
| 2,047,398 | Voss et al. | July 14, 1936 |
| 2,286,062 | Condo et al. | June 9, 1942 |
| 2,430,313 | Vana | Nov. 4, 1947 |
| 2,490,489 | Tauch | Dec. 6, 1949 |